United States Patent
Übelacker et al.

(10) Patent No.: US 11,292,364 B2
(45) Date of Patent: Apr. 5, 2022

(54) SEAT OCCUPANCY DETECTION WITH ACCELERATION SIGNAL

(71) Applicant: GRAMMER AG, Amberg (DE)

(72) Inventors: Roland Übelacker, Amberg (DE); Hubert Wittmann, Amberg (DE); Tobias Stahl, Amberg (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 16/774,217

(22) Filed: Jan. 28, 2020

(65) Prior Publication Data

US 2020/0238853 A1 Jul. 30, 2020

(30) Foreign Application Priority Data

Jan. 29, 2019 (DE) .......................... 102019102105.7

(51) Int. Cl.
*B60N 2/02* (2006.01)
*B60N 2/00* (2006.01)
*B60R 21/015* (2006.01)

(52) U.S. Cl.
CPC .......... *B60N 2/002* (2013.01); *B60R 21/0156* (2014.10); *B60R 21/01532* (2014.10); *B60R 21/01534* (2014.10)

(58) Field of Classification Search
CPC .. B60N 2/002; B60N 2/508; B60R 21/01512; B60R 21/01532; B60R 21/0156; B60R 21/01534
See application file for complete search history.

(56) References Cited

U.S. PATENT DOCUMENTS

| 7,043,997 B2* | 5/2006 | Mattson ............ B60R 21/01538 |
| | | 177/210 R |
| 8,493,197 B2 | 7/2013 | Nakanishi et al. |
| 2005/0131607 A1 | 6/2005 | Breed |
| 2006/0092023 A1 | 5/2006 | Hofbeck et al. |
| 2007/0061102 A1 | 3/2007 | Kim |
| 2007/0135982 A1 | 6/2007 | Breed et al. |

(Continued)

FOREIGN PATENT DOCUMENTS

| AU | 2013220935 | 8/2014 |
| CN | 1642788 | 7/2005 |

(Continued)

OTHER PUBLICATIONS

Extended Search Report for European Patent Application No. 20152100.2, dated Sep. 23, 2020, 3 pages.
Extended Search Report for European Patent Application No. 20152090.5, dated Jul. 6, 2020, 3 pages.
Official Action for German Patent Application No. DE 102019102105. 7, dated Sep. 2, 2019, 3 pages.

(Continued)

*Primary Examiner* — James A English
(74) *Attorney, Agent, or Firm* — Sheridan Ross P.C.

(57) ABSTRACT

The invention relates to a system for seat occupancy detection, comprising a vehicle seat for a driver with an upper part and at least one suspension-damper system, an acceleration sensor being arranged on the upper part which is designed to determine a characteristic of an acceleration of the upper part as a function of time, an evaluation unit being provided which is designed to create an evaluation of the characteristic of the acceleration and optionally to send a signal to a higher-level control unit, the evaluation unit also being designed to assign the evaluation to a value of a mass of an object with which the vehicle seat is currently occupied.

13 Claims, 3 Drawing Sheets

(56) References Cited

U.S. PATENT DOCUMENTS

| | | | | |
|---|---|---|---|---|
| 2010/0213345 A1* | 8/2010 | Haller | ............... | B60N 2/525 |
| | | | | 248/550 |
| 2017/0305311 A1* | 10/2017 | Haller | ............... | B60N 2/505 |
| 2018/0170213 A1* | 6/2018 | Lu-Dac | ............... | B60N 2/26 |
| 2019/0054841 A1* | 2/2019 | Cech | ............... | G08B 21/22 |
| 2019/0143843 A1 | 5/2019 | Ubelacker et al. | | |
| 2019/0231272 A1* | 8/2019 | Yamaji | ............... | A61B 5/0507 |
| 2019/0317622 A1* | 10/2019 | Leigh | ............... | G06F 3/0446 |
| 2020/0027288 A1* | 1/2020 | Ubelacker | ............... | G01H 1/16 |
| 2020/0238852 A1* | 7/2020 | Ubelacker | ............... | B60N 2/002 |

FOREIGN PATENT DOCUMENTS

| | | | | |
|---|---|---|---|---|
| CN | 102826066 | | 12/2012 | |
| DE | 10337992 | | 4/2005 | |
| DE | 102004050884 | | 4/2006 | |
| DE | 102006026705 | | 12/2007 | |
| DE | 102009014354 | | 11/2009 | |
| DE | 102017106949 | | 11/2017 | |
| DE | 202018104878 | | 9/2018 | |
| JP | 2012-032312 | | 2/2012 | |
| WO | WO 2014/085302 | | 6/2014 | |
| WO | WO-2018073939 A1 * | | 4/2018 | ........... A61B 5/1102 |

OTHER PUBLICATIONS

Official Action for German Patent Application No. 102019102102.2, dated Sep. 2, 2019, 3 pages.

International Search Report prepared by the European Patent Office dated Jun. 28, 2017, for International Application No. PCT/EP2017/060465.

Official Action for U.S. Appl. No. 16/097,465, dated Feb. 18, 2020 5 pages.

Official Action for U.S. Appl. No. 16/097,465, dated Jun. 18, 2020 5 pages.

Official Action for U.S. Appl. No. 16/097,465, dated Oct. 22, 2020 6 pages.

Official Action for U.S. Appl. No. 16/097,465, dated Feb. 1, 2021 6 pages.

Official Action with machine translation for Japan Patent Application No. 2020-010691, dated Jun. 4, 2021, 6 pages.

Official Action with machine translation for Japan Patent Application No. 2020-010689, dated Jun. 4, 2021, 6 pages.

Official Action for U.S. Appl. No. 16/097,465, dated May 28, 2021 8 pages.

Official Action with English Translation for China Patent Application No. 202010078663.0, dated Dec. 3, 2021, 16 page.

* cited by examiner

SEAT OCCUPANCY DETECTION WITH ACCELERATION SIGNAL

CROSS-REFERENCE TO RELATED APPLICATION

This application claims the benefit of German Patent Application No. DE 102019102105.7 filed Jan. 29, 2019, the entire disclosure of which is incorporated herein by reference in its entirety.

FIELD

The invention relates to a system for seat occupancy detection, comprising a vehicle seat for a driver with an upper part and at least one suspension-damper system, an acceleration sensor being arranged on the upper part which is designed to determine a characteristic of an acceleration of the upper part as a function of time, an evaluation unit being provided which is designed to create an evaluation of the characteristic of the acceleration and optionally to send a signal to a higher-level control unit.

BACKGROUND

Vibrations of the upper part of the vehicle seat, for example with respect to a vehicle floor, a lower part, and/or the ground beneath the vehicle, occur almost always when the vehicle seat and/or the associated vehicle is in operation. These vibrations are influenced, for example, by the vibrations of components belonging to the vehicle (for example, the engine) and by the state of the ground beneath the vehicle (for example, a pothole). For the sake of simplicity, only uniaxial accelerations and vibrations in the height direction (z direction) of the vehicle seat are considered below; however, the underlying considerations also apply analogously to multi-axis vibration processes.

There are also safety regulations which stipulate that the vehicle or actuators or assemblies arranged on the vehicle must not be put into operation or must be switched to standby if the seat is not occupied. Such an assembly is, for example, a mower of a combine harvester. The background to this is the fear that, in the event of an unoccupied seat, the driver may be inadmissibly near the still active assembly in order to carry out maintenance work there, the risk of injury being extremely high in this case. For example, the driver could injure himself while the mower is still running.

In order to avoid switching off such actuators via the control unit, it is known for drivers to place a tool box or a beverage crate on the seat, for example, so that their weight ("dead mass") is incorrectly interpreted by the control unit as the weight of a driver. The result is that the actuators remain active.

SUMMARY

The object of the present invention is therefore to enable automatic detection of the seat occupancy state, in order, inter alia, to minimize the risk of injury.

The object is achieved by a system for seat occupancy detection, comprising a vehicle seat for a driver with an upper part and at least one suspension-damper system, an acceleration sensor being arranged on the upper part which is designed to record a characteristic of acceleration of the upper part as a function of time, an evaluation unit being provided which is designed to generate an evaluation of the characteristic of acceleration and, optionally, to send a signal to a higher-level control unit, the evaluation unit being further designed to assign the evaluation to a value of a mass of an object with which the vehicle seat is currently occupied.

The present invention can be used, for example, in vehicle seats which are classically sprung, in which, for example, the upper part is resiliently mounted relative to a lower part. For example, it can also be used in vehicle seats in which the upper part is not resiliently mounted relative to the lower part. Unless otherwise stated, the following explanations apply to both cases.

It is provided that the vehicle seat, for example below the acceleration sensor, has a suspension-damper system. In the case of classically sprung seats, this is formed, for example, by means of a suspension unit comprising at least one spring and/or at least one damper, which are preferably arranged between the upper part and the lower part; for example, this spring-damper system is supported by a scissor-type frame. In the case of seats in which the upper part is not resiliently supported relative to the lower part, this suspension-damper element is formed, for example, by means of a cushion part and/or by means of the foam of the upholstery part.

In all vehicle seats, the acceleration is measured on the upper part, for example on a surface of an upholstery part of the upper part.

The characteristic of the acceleration over time can also be referred to as a vibration diagram. Vibrations are generally referred to as repeated temporal fluctuations in the state variables of a system. Fluctuation is to be understood as the deviation from an average. The state variables can be, for example, the deflection (path), the speed or the acceleration of the vibrating system.

This assignment makes it possible already to determine whether the seat is occupied or not. If the seat is recognized as occupied, it is provided, for example, that a corresponding signal is sent from the evaluation unit to the higher-level control unit and/or that the actuators on the machine may remain in operation. If the seat is recognized as not occupied, it is provided, for example, that a corresponding signal is sent to the higher-level control unit, whereupon the control unit can switch off the actuators on the machine. This increases driver safety.

This takes advantage of the fact that the parameters on which the vibration diagram is based are characteristic of the vibration state of the seat.

Periodic vibrations have the property that their function values are repeated at regular intervals. The intervals between the occurrence of the same function values are called periods. If, for example, the acceleration is subject to periodic oscillation, the same acceleration value is reached again after the duration of a period. The reciprocal 1/T of the period T is the frequency f (with the unit Hertz or Hz, where 1 Hz=1/s). The maximum fluctuation that occurs is called amplitude A.

In the case of an unoccupied vehicle seat (case 2), it can be observed, for example, that with the vehicle engine running, the resulting vibrations coming from the engine are introduced into the upper part of the seat undamped by the suspension. The seat oscillates periodically with a specific frequency f2 and an amplitude A2. If the seat is occupied by a driver (case 1), it can be assumed in a simplified manner that the seat vibrates with an amplitude A1 and with a periodic frequency f1. It can be assumed that the driver dampens the vibrations with his mass, so that the amplitude of the vibration drops (A1 is, for example, less than A2). It can also be assumed that the frequency drops, so that f1 is less than f2.

If a dead mass is now placed on the seat (case 3), it can be assumed in a simplified manner that the seat vibrates with an amplitude A3 and with a periodic frequency f3. It can be assumed that the dead mass does indeed dampen the vibrations, so that the amplitude of the vibration drops compared to case 2 (A3 is, for example, smaller than A2). It can also be assumed that the frequency drops, so that f3 is less than f2. However, it can be assumed that the mass of the box, which is, for example, about 20 kg, is smaller than the mass of the driver, so that the decrease in amplitude and the decrease in frequency in case 3 is smaller than in case 1. Thus, the following applies: A1<A3<A2 and f1<f3<f2.

At the same time, it can be assumed that a driver behaves differently than the dead mass. In particular, the vibrations introduced are dampened by the driver's limbs and muscles. In addition, the driver may brace against the steering wheel or an armrest surface, which leads to a smaller influence of the mass of the driver in the vibration behaviour. Furthermore, the driver may make sudden movements, which are reflected in the vibration diagram as sudden accelerations.

It can therefore be assumed that the vibrations of a dead mass and a living driver will also differ if the weight of the two is the same. These differences can advantageously be detected by the system according to the invention and by means of the method according to the invention, so that an assignment can also be made here as to whether and with which object (driver or dead mass) a vehicle seat is occupied.

It is provided, for example, that the evaluation comprises an amplitude spectrum of the characteristic of the acceleration, the evaluation unit also being designed to compare the amplitude spectrum to at least one temporally preceding amplitude spectrum and/or to at least one predefined amplitude spectrum.

In particular, the term "evaluation" is to be understood as meaning an evaluation based on the vibration diagram a(t) and/or an evaluation based on the associated amplitude spectrum a(f).

Here, use is made of the fact that harmonic vibration components can be read out relatively well from the amplitude spectrum of the vibration. For this purpose, an amplitude spectrum (also called a frequency spectrum) can be determined as an evaluation of the characteristic of the vibration, for example by means of a Fourier transformation or a fast Fourier transformation (FFT). An oscillation signal is basically interpreted in this case as a superposition of various individual signals. The resulting amplitude spectrum is therefore plotted against the frequency and has, for example, different spectral lines (peaks), each of which represents a measure of the amplitude and of the frequency of the individual signal in the period under consideration. The mathematics on which the FFT is based are known from the prior art and should not be considered in more detail within the scope of this invention.

In the simplest case, an amplitude spectrum of a simple sine wave has only one peak or a maximum peak with adjacent smaller peaks.

For example, the system also includes a data store. For example, the data memory includes stored waveforms a0(t), a20(t) and a60(t) as well as the associated stored amplitude spectra a0(f), a20(f) and a60(f), the index 0 relating to an unoccupied seat, the index 20 applying to a seat occupied by a dead mass of 20 kg and the index 60 applying to a seat occupied by a driver of 60 kg. It goes without saying that characteristic values of other masses can of course also be used instead of the stated masses. In general, it can be assumed, for example, that a driver has at least a mass of 50 kg, so that characteristic values for the corresponding index 50 can also be sensibly stored and compared.

It is also possible that the data memory has already analysed various characteristic values from these predetermined vibration characteristics and associated amplitude spectra: with respect to the vibration a(t), a target value A00 for an amplitude of the unoccupied seat, a target value A20 for an amplitude of the seat, which is occupied by a dead mass of 20 kg, and a target value A60 for an amplitude of the seat, which is occupied by a driver of 60 kg. Furthermore, with respect to the amplitude spectrum a(f), the data memory comprises a setpoint f00 for a frequency of the unoccupied seat, a setpoint f20 for a frequency of the seat occupied by a dead mass and a setpoint f60 for a frequency of the seat, which is occupied by a driver of 60 kg. It is also possible for the number of peaks and their spacing (temporally at a(t) or frequently at a(f)) of the specifications a(t) and a(f) to be stored.

In order to decide whether the seat is occupied or not, the evaluation unit can, for example, carry out a first evaluation of a(t), which compares the maximum deflection (amplitude A') of the acceleration a(t) in a specific period of time to a previous value or a target value of the amplitude stored in the data memory. If the evaluation unit determines that the amplitude A' and the target value A00 are the same, it is assumed that the seat is unoccupied. If the evaluation unit determines that the amplitude A' and the target value A20 are the same, it is assumed that the seat is occupied by a mass of 20 kg. In these two cases, the control unit could thus switch off the actuator. If the evaluation unit determines that the amplitude A' and the target value A60 are the same, it is assumed that the seat is occupied by a driver. In this case, the control unit could therefore refrain from switching off the actuator.

The evaluation unit can also perform a second evaluation of a(t), which provides for a comparison of the amplitude spectra. The maximum peaks and the associated frequencies are considered. The second evaluation thus provides, for example, that the frequency (f') of the amplitude spectrum a(f) belonging to a maximum peak is compared to a previous value or a frequency setpoint stored in the data memory within a specific period of time. If the evaluation unit determines that the frequency f' and the target value f00 are the same, it is assumed that the seat is unoccupied. If the evaluation unit determines that the frequency f' and the setpoint f20 are the same, it is assumed that the seat is occupied by a dead mass. In these two cases, the control unit could thus switch off the actuator. If the evaluation unit determines that the frequency f' and the setpoint f60 are the same, a seat occupied by a driver is assumed. In this case, the control unit could therefore refrain from switching off the actuator.

It is also possible for the first and/or the second evaluation to carry out a comparison of the vibration diagrams of two different instants t1 and t2. For example, let t1=0 and t2=10 s. A comparison of the amplitudes and/or the frequencies as described can also be carried out between these two diagrams.

It is of course possible for both the first evaluation and the second evaluation to have the comparison take place with a specific tolerance, so that, for example, the condition A'=A00 is affirmed by the evaluation unit even if the actual value of A' is in a range from $(1-p)*A00$ to $(1+p)*A00$. For example, p is in a range of 0.01 to 0.1; and, for example, p=0.05.

As described above, it is therefore advantageous according to a preferred embodiment if the evaluation unit is further configured to determine a deviation between a first frequency that can be assigned to a maximum peak of the determined amplitude spectrum and a second frequency that can be assigned to a maximum peak of the compared amplitude spectrum. This is helpful, for example, to differentiate between the states "seat not occupied," "seat occupied by dead mass" and "seat occupied by driver."

It is therefore advantageous if the evaluation unit is also designed to evaluate the characteristic of the acceleration and to compare it to at least one temporally preceding characteristic and/or to at least one predetermined characteristic. Various statements can be made from this curve. For example, a maximum value of the amplitude in a specific period of time can be compared in different diagrams or to target values (analogous to the procedure described above).

In order to facilitate the aforementioned assignments, it can also be provided that the evaluation includes the creation of an envelope curve of a characteristic a(t). This envelope can then be compared to specified or previous envelope curves as described. The envelope curve is also called "envelope" and describes the characteristic of the amplitude in the case of vibrations. For example, the values of the characteristic a(t) at the amplitudes which represent the maxima of the oscillation a(t) are marked as points (the minima are initially ignored). Then these points are connected one after the other, so that an envelope curve results. The envelope curve can be compared, for example, in terms of its characteristic (for example, falling in a specific period of time when "getting in" and increasing when "leaving") or its continuity (steady in the described states and non-steady in the described processes). The expression "continuity" should be interpreted here with regard to its mathematical interpretation; expressed clearly, a function is continuous if it does not "jump".

It is therefore advantageous if the evaluation unit is also designed to assign at least one envelope curve to the characteristic of the acceleration and to evaluate a characteristic of the at least one envelope curve.

Here the fact is used that a driver often does not cause a completely periodic oscillation with only one frequency, at least not over a longer period of time; on the contrary, it is known from practice that a corresponding characteristic a(t) often has smaller or larger peaks which result from the movements of the driver. A dead mass, however, cannot make such movements; the envelope curve will therefore remain largely constant. It is therefore possible, for example, to examine the slope and/or the continuity of an envelope curve. If the slope equals zero and/or the continuity is guaranteed over a predeterminable period of time, it is assumed that the seat is occupied by a dead mass. If the slope is not zero or not exclusively zero and/or the continuity is not guaranteed or not exclusively guaranteed over a predeterminable period of time, it is assumed that the seat is occupied by a driver. This examination can take place in parallel or as an alternative to the frequency comparison.

The object of the invention is also achieved by a method for seat occupancy detection within a system, the system comprising a vehicle seat for a driver with an upper part and at least one suspension-damper system, an acceleration sensor arranged on the upper part and an evaluation unit comprising the following steps:

(101) detecting a characteristic of an acceleration of the upper part as a function of a time by the acceleration sensor, (102) creating an evaluation of the characteristic of the acceleration by the evaluation unit, (103) comparison of the evaluation to the evaluation of a temporally preceding characteristic or to a predefined evaluation, (104) assigning the evaluation to one of a plurality of states, the states being selected from a group which comprises an occupied state, an unoccupied state of the vehicle seat, and a state of the vehicle seat occupied by a dead mass, (105) repetition of steps (101) to (104) up to a predefinable termination criterion.

The method according to the invention applies in particular to a system according to one of the system claims. All of the exemplary embodiments described in connection with the system according to the invention and their advantages also apply advantageously to the method according to the invention.

It should be mentioned that the terms "sitting" and "occupying" each describe the same process according to which a driver sits on the seat. It should also be mentioned that the terms "leaving" and "getting up" each describe the same process according to which a driver leaves the seat.

BRIEF DESCRIPTION OF THE DRAWINGS

Further advantages, goals and features of the present invention are explained with reference to the accompanying drawings and the following description, in which different embodiments of the vehicle seat according to the invention are shown and described by way of example. In the drawings.

DETAILED DESCRIPTION

Figure 1A:
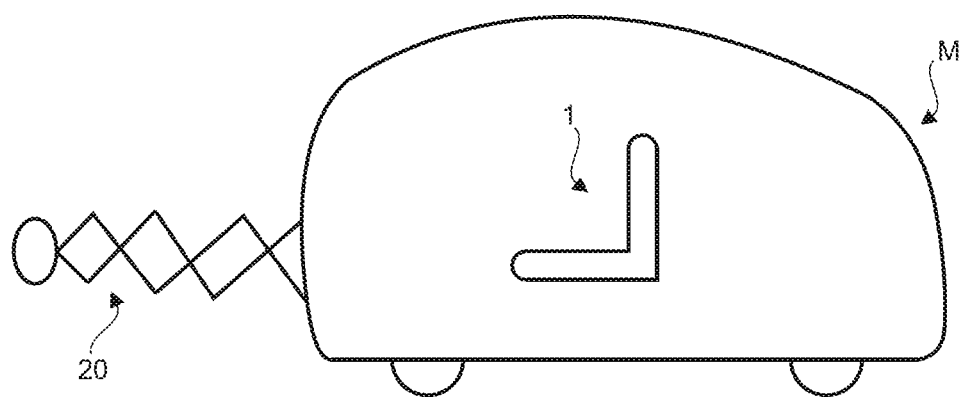
FIG. 1a shows a schematic representation of a vehicle with a vehicle seat and an actuator.

According to FIG. 1a, a vehicle M with a vehicle seat 1 and an actuator 20 is shown in a highly simplified representation. For example, vehicle M is a combine harvester and actuator 20 is the associated mower.

Figure 1B:
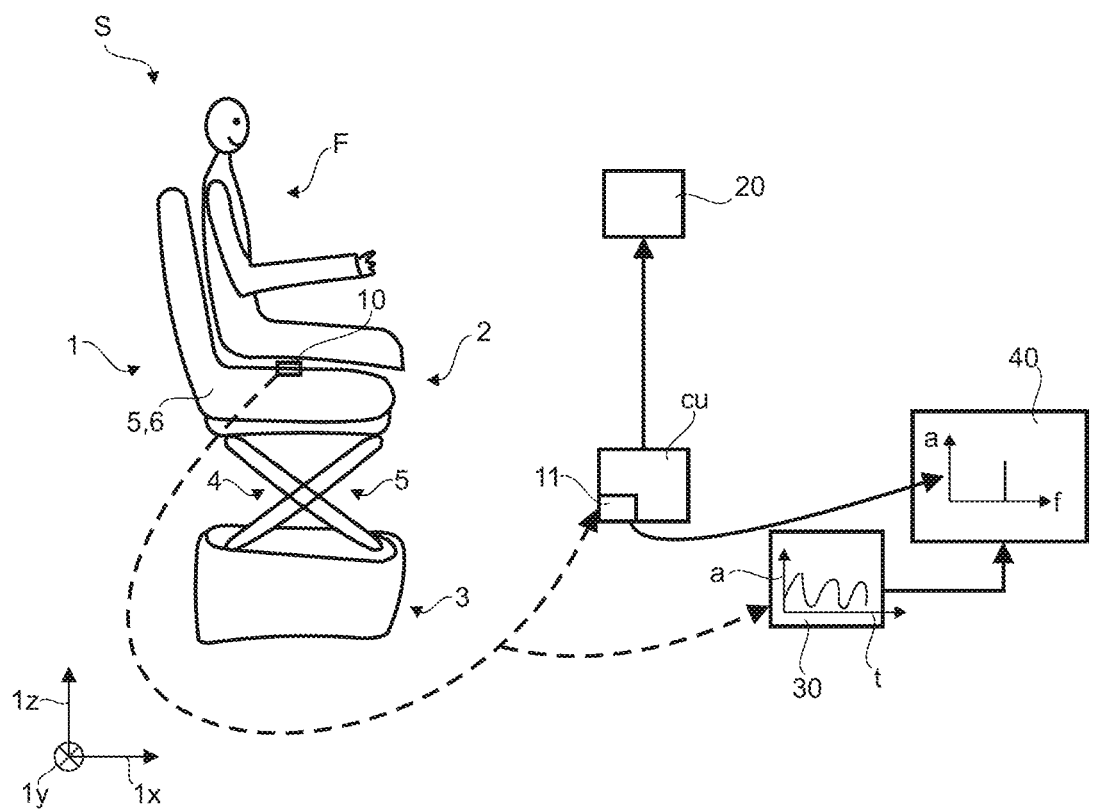
FIG. 1b shows a schematic representation of a system according to the invention.

FIG. 1b shows a system (S) for seat occupancy detection, comprising the vehicle seat (1) for a driver (F) with an upper part (2) and a suspension-damper system (5). In the present case, the upper part (2) is resiliently mounted relative to the lower part (3) of the vehicle seat (1) by means of a scissor-type frame (4), which is supported, for example, by suspension elements and damping elements of the suspension-damper system (5) (not shown). It would also be conceivable that the scissor-type frame (4) is dispensed with and the suspension-damper system (5) is formed by means of the upholstery part (6) of the upper part (2).

For illustration purposes, a Cartesian coordinate system with the axes 1x (longitudinal direction of the seat), 1y (width direction of the seat) and 1z (height direction of the seat) is shown.

An acceleration sensor (10) is arranged on the upper part 2, in this case on the upholstery part (6) of the upper part 2, and is designed to detect a characteristic of an acceleration (a) of the upper part (2) as a function of a time (t). An example of a resulting characteristic is shown as diagram 30. In the present case, this acceleration sensor (10) transmits the recorded characteristic to an evaluation unit (11).

In the present case, the evaluation unit (11) is designed to create an evaluation (a') of the characteristic (a(t)) of the acceleration (a) and to send a signal to a higher-level control unit (CU). In the present case, the evaluation is designed as an amplitude spectrum a(f) and is shown as an example in diagram 40.

The evaluation unit (11) is now designed to assign the evaluation (a') to a value of a mass (m1, m2) of an object (F, K) with which the vehicle seat (1) is currently occupied, for example with a driver F or a box K as a dead mass. In other words, the evaluation unit (11) is designed to assign the evaluation (a') to one of a plurality of states (J1, J2, J3), the states (J1, J2) being selected from a group which has an occupied state (J1), a non-occupied state (J2) of the vehicle seat (1) and a state (J3) of the vehicle seat (1) occupied by a dead mass. For example, the evaluation unit recognizes in the present case that the vehicle seat 1 is occupied by the driver F, who has a mass of 60 kg (state J1).

On the basis of the signals of the evaluation unit 11, the control unit (CU) can decide whether it transmits a signal to the actuator 20 which changes its state or not. In the present case, the driver F is on the vehicle seat 1 and thus outside the danger zone of the actuator 20, so that, for example, there is no signal from the control unit (CU) to the actuator 20, or a signal with which the actuator 20 can be put into operation.

Figure 2:
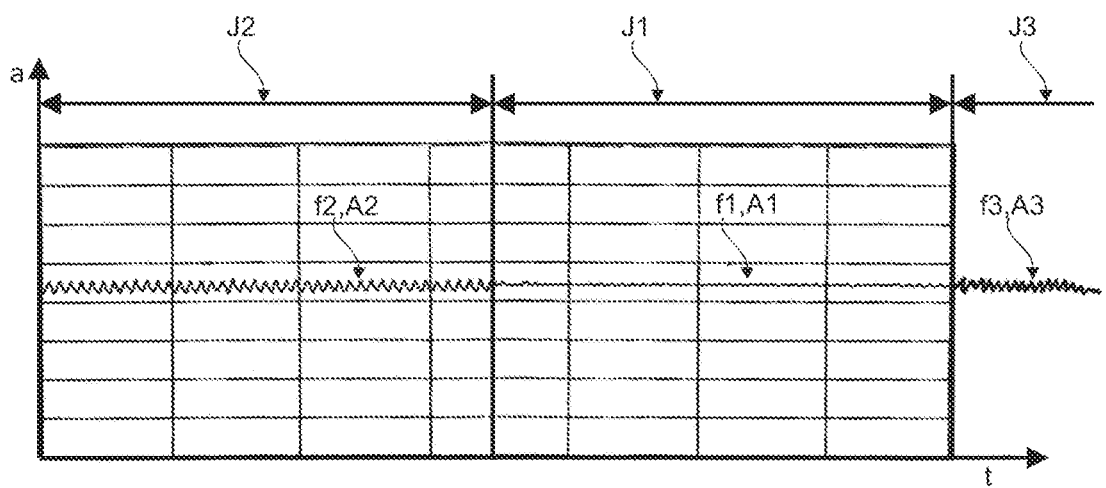
FIG. 2 shows an example of a characteristic a(t)

FIG. 2 now shows an oscillation curve a(t) with three temporally different sections (without any intermediate sections, which represent the exchange of mass), which can be assigned to states J1, J2 or J3 after evaluation. For example, the first section is to be assigned to state J2, that is to say to the unoccupied vehicle seat 1. The seat 1 oscillates substantially periodically with a specific frequency f2 and an amplitude A2. In the second section, the seat 1 is occupied by a driver F, so that the seat 1 vibrates with an amplitude A1 and with a periodic frequency f1. It is the case here that A1 is smaller than A2, which can be immediately read from the diagram, and that f1 is smaller than f2 (see also FIG. 3 for the evaluation). In the third section, the seat 1 is occupied by a dead mass, so that the seat 1 vibrates with an amplitude A3 and with a periodic frequency f3. It applies here that A3 is smaller than A2, but larger than A1, which can be immediately read from the diagram, and that f3 is smaller than f2, but larger than f1 (see also FIG. 3 for evaluation).

Figure 3:
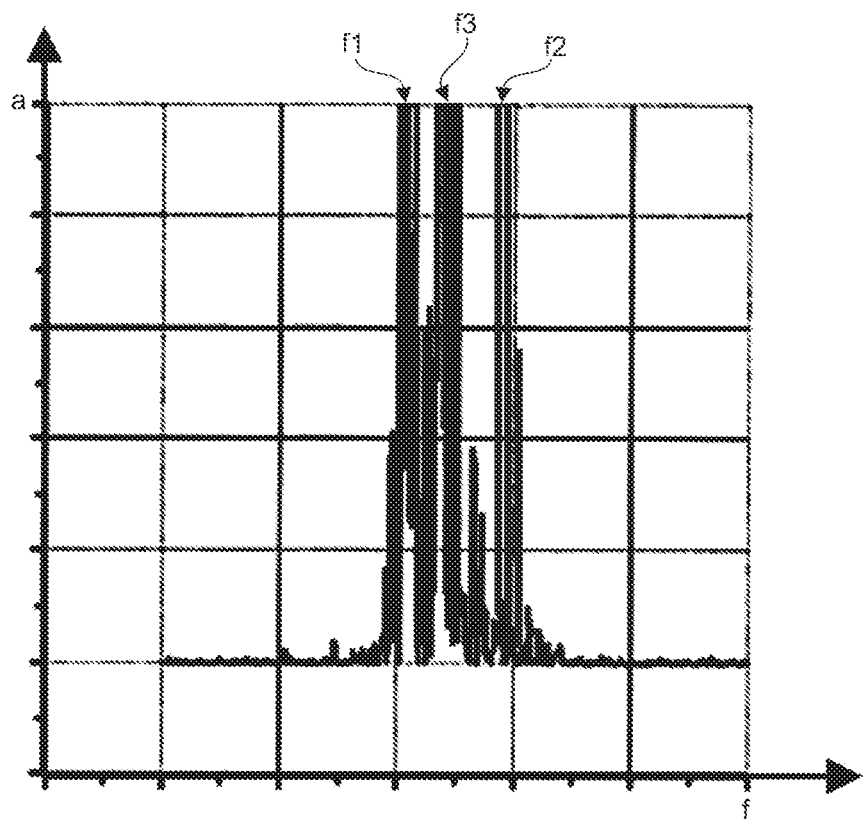
FIG. 3 shows an amplitude spectrum a(f) resulting from the characteristic of FIG. 2.

Using an FFT, an amplitude spectrum a(f) was calculated from the characteristic of the curve according to FIG. 2 and represented according to FIG. 3. It can be seen that a plurality of peaks accumulate around three frequencies f1, f2 and f3. This again clearly shows that the frequency f2 of the unoccupied seat differs significantly from the frequency f1 of the occupied seat; a comparison of the two by the evaluation unit 11 can thus serve as a basis for making a decision for the assignment of the state. The same applies to the frequency f3; this also is clearly distinguishable from the other two frequencies f1 and f2.

Figure 4:
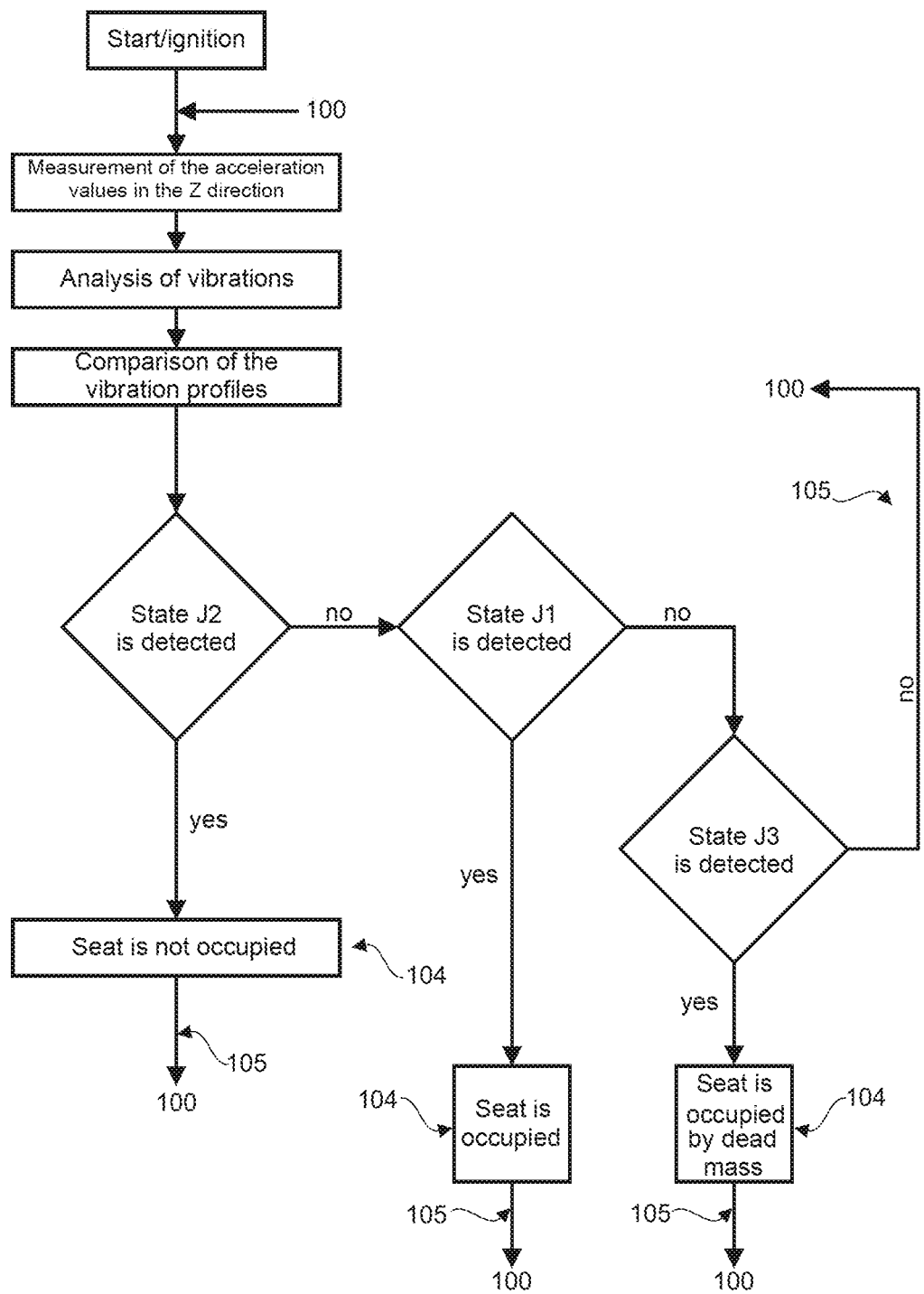
FIG. 4 shows a preferred sequence of the method according to the invention.

FIG. 4 shows a preferred characteristic of the method 100 according to the invention for seat occupancy detection within a system (S), the system (S) comprising a vehicle seat (1) for a driver (F) with an upper part (2) and at least one suspension-damper system (5), an acceleration sensor (10) arranged on the upper part (2) and an evaluation unit (11). After the engine has started, the shown embodiment of the method 100 comprises the following steps:

(101) detecting a characteristic (a(t)) of an acceleration (a) of the upper part (2) as a function of a time (t) by the acceleration sensor (10), (102) creating an evaluation of the characteristic (a(t)) of the acceleration (a) by the evaluation unit (11), (103) comparing the evaluation to the evaluation (a–1') of a temporally preceding characteristic (a(t)) or to a predetermined evaluation (a0'), (104) assigning the evaluation to one of a plurality of states (J1, J2, J3), the states (J1, J2, J3) being selected from a group which comprises an occupied state (J1), an unoccupied state (J2) of the vehicle seat (1), and a state (J3) of the vehicle seat (1) occupied by a dead mass, (105) repetition of steps (101) to (104) up to a predefinable termination criterion.

In the present case, it is first checked whether the unoccupied seat J2 is recognized. If no, it is checked whether the seat J1 occupied by a driver is recognized. If no, it is checked whether the seat J3 occupied by a dead mass is recognized. If no detection is possible here either, the process is repeated.

It is understood that the exemplary embodiment explained above is merely an initial design of the system S according to the invention and the method 100 according to the invention. In this respect, the design of the invention is not limited to this exemplary embodiment.

All the features disclosed in the application documents are claimed as being essential to the invention, provided that, individually or in combination, they are novel with respect to the prior art.

LIST OF REFERENCE CHARACTERS vehicle seat
1x longitudinal direction of the seat
1y width direction of the seat
1z height direction of the seat
2 upper part
3 lower part
4 scissor-type frame
5 suspension-damper system
6 upholstered part
10 acceleration sensor
11 evaluation unit
20 actuator
30, 40 diagram
100 method
101-105 step
a, a(t) acceleration
CU control unit
f frequency
F driver
J1, J2, J3 state
K box
M vehicle
S system
t time

The invention claimed is:

1. A system for seat occupancy detection, comprising:
a vehicle seat for a driver with an upper part and at least one suspension-damper system;
an acceleration sensor being arranged on the upper part that detects a characteristic of an acceleration of the upper part as a function of a time; and
an evaluation unit that creates an evaluation of the characteristic of the acceleration and optionally sends a signal to a higher-level control unit,
wherein the evaluation unit assigns the evaluation to one of a plurality of states of the vehicle seat, wherein the states are one of: occupied by the driver, unoccupied, or occupied by an inanimate mass,
wherein the evaluation unit assigns the evaluation a value of a mass of an object occupying the vehicle seat, wherein the evaluation unit determines, when a vibration diagram presents a first pattern, that the state of the vehicle seat is occupied by the driver of a first mass, and wherein the evaluation unit determines, when the vibration diagram presents a second pattern different from the first pattern, that the vehicle seat is occupied by the inanimate mass of the first mass.

2. The system according to claim 1, wherein the evaluation comprises an amplitude spectrum of the characteristic of the acceleration, and wherein the evaluation unit is also designed to compare the amplitude spectrum with at least one temporally preceding amplitude spectrum or with at least one predetermined amplitude spectrum.

3. The system according to claim 2, wherein the evaluation unit is further designed to detect a deviation between a first frequency that is assigned to a maximum peak of a determined amplitude spectrum and a second frequency that is assigned to the maximum peak of the compared amplitude spectrum.

4. The system according to claim 2, wherein the evaluation unit is further designed to detect a deviation of at least one of a number of peaks or frequencies assignable to the peaks between the predetermined amplitude spectrum and the compared amplitude spectrum.

5. The system according to claim 1, wherein the evaluation unit is further designed to evaluate the characteristic of the acceleration and to compare the characteristic of the acceleration with at least one temporarily preceding characteristic or with at least one predetermined characteristic.

6. The system according to claim 1, wherein the evaluation unit is further configured to assign at least one envelope curve to the characteristic of the acceleration and one characteristic of the at least one envelope curve.

7. A method for seat occupancy detection within a system, the system comprising a vehicle seat for a driver with an upper part and at least one suspension-damper system, one acceleration sensor arranged on the upper part and an evaluation unit, the method comprising:

detecting a characteristic of an acceleration of the upper part as a function of a time by the acceleration sensor;

creating an evaluation of the characteristic of the acceleration via the evaluation unit;

comparing the evaluation to the evaluation of a temporally preceding characteristic or to a predetermined evaluation;

assigning of the evaluation to one of a plurality of states, the states being one of: occupied by the driver, unoccupied, and occupied by an inanimate mass;

assigning the evaluation a value of a mass of an object occupying the vehicle seat;

determining, when a vibration diagram presents a first pattern, that the state of the vehicle seat is occupied by the driver of a first mass;

determining, when the vibration diagram presents a second pattern different from the first pattern, that the vehicle seat is occupied by an inanimate mass of the first mass; and repeating the detecting, creating, comparing, and assigning of the evaluation to one of a plurality of states steps until a predefinable termination criterion is reached.

8. The system according to claim 1, wherein the control unit switches off an actuator when the evaluation unit determines that the vehicle seat is occupied by an inanimate mass or is unoccupied, and wherein the control unit refrains from switching off the actuator when the evaluation unit determines that the vehicle seat is occupied by the driver.

9. The system according to claim 1, wherein the control unit decides, based on the signal of the evaluation unit, whether to send a second signal to an actuator that changes a state of the actuator, and wherein the signal of the evaluation unit depends on the states of the vehicle seat.

10. The system according to claim 1, wherein the first pattern has a first periodic frequency, wherein the second pattern has a second periodic frequency, and wherein the first periodic frequency is smaller than the second periodic frequency.

11. The system according to claim 10, wherein the first pattern has a first amplitude, wherein the second pattern has a second amplitude, and wherein the first amplitude is less than the second amplitude.

12. The method according to claim 7, wherein the first pattern has a first periodic frequency, wherein the second pattern has a second periodic frequency, and wherein the first periodic frequency is smaller than the second periodic frequency.

13. The method according to claim 12, wherein the first pattern has a first amplitude, wherein the second pattern has a second amplitude, and wherein the first amplitude is less than the second amplitude.

\* \* \* \* \*